US012798674B2

(12) United States Patent
Laurens

(10) Patent No.: US 12,798,674 B2
(45) Date of Patent: Nov. 17, 2026

(54) DEVICE FOR ASSISTING WITH POSITIONING A STEERING WHEEL OF A VEHICLE IN THE NEUTRAL STRAIGHT-RUNNING POSITION

(71) Applicant: Fréderic Laurens, La Brillanne (FR)

(72) Inventor: Fréderic Laurens, La Brillanne (FR)

(73) Assignee: AE LINE, Espaly-Saint-Marcel (FR)

( * ) Notice: Subject to any disclaimer, the term of this patent is extended or adjusted under 35 U.S.C. 154(b) by 696 days.

(21) Appl. No.: 17/914,935

(22) PCT Filed: Mar. 28, 2021

(86) PCT No.: PCT/IB2021/052559
§ 371 (c)(1),
(2) Date: Sep. 27, 2022

(87) PCT Pub. No.: WO2021/191878
PCT Pub. Date: Sep. 30, 2021

(65) Prior Publication Data

US 2023/0331300 A1 Oct. 19, 2023

(30) Foreign Application Priority Data

Mar. 27, 2020 (FR) ........................................ 2003030

(51) Int. Cl.
*B62D 15/02* (2006.01)
*G01B 11/26* (2006.01)
*G01B 21/26* (2006.01)

(52) U.S. Cl.
CPC .......... *B62D 15/0245* (2013.01); *G01B 11/26* (2013.01); *G01B 21/26* (2013.01); *G01B 2210/28* (2013.01)

(58) Field of Classification Search
CPC .... B62D 15/0245; G01B 11/26; G01B 21/26; G01B 2210/28; G01M 17/06; B60R 2011/0003; B60R 2011/008; B60R 9/058
(Continued)

(56) References Cited

U.S. PATENT DOCUMENTS 4,690,557 A * 9/1987 Wiklund ............ G01B 11/2755 33/288
9,950,677 B2 * 4/2018 Poliquin .............. G03B 17/561
2017/0131095 A1 5/2017 Kim

FOREIGN PATENT DOCUMENTS

DE 10 2008 008 858 8/2009
DE 102008008858 A1 * 8/2009 ............. G01B 11/26
(Continued)

OTHER PUBLICATIONS

International Search Report for PCT/IB2021/052559 dated Jun. 21, 2021, 4 pages.
(Continued)

*Primary Examiner* — Xin Y Zhong
*Assistant Examiner* — Evan Mancini
(74) *Attorney, Agent, or Firm* — NIXON & VANDERHYE, PC

(57) ABSTRACT

Disclosed is a device for assisting placement of the steering wheel of a vehicle in a neutral position of a trajectory and in a rectilinear position, device including a light source configured to project at least one light pattern defining at least one alignment direction and fixing unit adapted to allow temporary fixing of the device on the vehicle so that the light pattern is projected inside the circle delimited by the steering wheel.

21 Claims, 3 Drawing Sheets

(58) Field of Classification Search
USPC .......................................................... 116/31
See application file for complete search history.

(56) References Cited

FOREIGN PATENT DOCUMENTS

| | | | | | |
|---|---|---|---|---|---|
| DE | 202012001029 | U1 * | 4/2012 | ........ | G01M 17/0074 |
| DE | 10 2012 025 530 | | 6/2014 | | |
| DE | 102012025530 | A1 * | 6/2014 | ............ | G01B 11/26 |
| DE | 10 2013 021 475 | | 6/2015 | | |
| DE | 102013021475 | A1 * | 6/2015 | ............ | G01B 11/25 |

OTHER PUBLICATIONS

Written Opinion of the ISA for PCT/IB2021/052559 dated Jun. 21, 2021, 11 pages. (with translation).
"Stanley Cubix Self-Levelling Laser Level | Screwfix." YouTube, uploaded by Screwfix, Jan. 4, 2016, www.youtube.com/watch?v=9HmtTwRP2sU (Transcript Provided, pp. 1-5).

* cited by examiner

DEVICE FOR ASSISTING WITH POSITIONING A STEERING WHEEL OF A VEHICLE IN THE NEUTRAL STRAIGHT-RUNNING POSITION

This application is the U.S. national phase of International Application No. PCT/IB2021/052559 filed Mar. 28, 2021 which designated the U.S. and claims priority to FR 2003030 filed Mar. 27, 2020, the entire contents of each of which are hereby incorporated by reference.

BACKGROUND OF THE INVENTION

Field of the Invention

The present invention relates to the technical field of devices used in a workshop to ensure, among other things, the adjustment of the parallelism of the steered wheels of a vehicle or, more generally, the adjustment of the vehicle running gear or its trajectory.

Description of the Related Art

In order to ensure the safe use of a motor vehicle, it is necessary to regularly adjust the running gear of the latter. In addition, proper adjustment contributes to guaranteeing wear of the tires that is as even as possible as well as ensuring the correct operation of the active and passive safety devices integrated into the vehicle.

On a motor vehicle, the adjustment of the wheels is generally done by placing the vehicle on a car lift so as to be able to easily access the adjusting members of the running gear, namely the systems for connecting the wheels of the vehicle to the chassis. When adjusting the parallelism of the steered wheels, the operator can unintentionally slightly modify the orientation of the steered wheels, which can induce an adjustment bias and in particular a slight shift between the theoretical position of the steering wheel normally corresponding to a rectilinear trajectory and the actual position of the steering wheel actually corresponding to a rectilinear trajectory. However, this bias can be troublesome when the vehicle includes sensor systems which analyze the trajectory of the vehicle as a function of the position or the degree of rotation of the steering wheel. In order to avoid this bias, the operator making the vehicle settings, in particular that of the parallelism, must check at several stages of the adjustment action that the steering wheel is correctly placed in the neutral position corresponding to a straight trajectory when the steered wheels are parallel to each other in an orientation corresponding to a rectilinear trajectory of the vehicle. However, to place the steering wheel in the neutral position or check its placement in this neutral position, it is necessary to get seated in the driving position in the driver's seat in order to have the visual cues necessary for the check. However, when the vehicle is on a lift, on the one hand, it is difficult to quickly access the driving position and, on the other hand, the methods of locking the steering wheel necessary for the adjustments make access to the driver's seat almost impossible.

SUMMARY OF THE INVENTION

In order to respond to this problem, a steering wheel positioning aid device has been proposed comprising a plate intended to be fixed on the steering wheel and equipped with a spirit level giving a horizontal reference. When using the device, the operator sits in the driving position and turns the steering wheel so that the bubble is in a position corresponding to horizontality. This device has two drawbacks. First of all, it imposes as a prerequisite that the horizontality corresponds to the neutral position of the steering wheel. Then, it requires the operator to be perfectly in front of the level in order to avoid reading errors induced by parallax defects so that the operator can only carry out the check while being in the driving position.

It has also been proposed by a patent application DE102008008858 a system comprising a graduated disc intended to be fixed on the steering wheel and associated with a lamp fixed or placed on the dashboard projecting a luminous index on the graduated disc. Such a device makes it possible to monitor and measure the amplitude of rotation of the steering wheel according to the drift of the front gear and to ensure a control of the dynamic relationship between the rotation of the steering wheel and the variation of the steering angle but does not make it possible to know or control the neutral position of the steering wheel as is necessary to adjust in particular the parallelism of the steering gear, generally the front gear. In fact, there is nothing to guarantee, when fixing the graduated disc on the steering wheel, that the 0 of the disc corresponds to the neutral position of said steering wheel.

An application DE102013021475 proposed an automated system for adjusting the chassis and the steering system of a vehicle at the end of the production line. This system which is intended to operate without human intervention, aims to calibrate the steering angle sensors. To this end, the system comprises a device for projecting onto a surface of the steering wheel a temporally and/or spatially coded pattern adapted to be analyzed by an electronic image recognition system which, depending on the variations in shape of the pattern, calculates the angle of rotation of the steering wheel and sends it to a vehicle sensor calibration system. Such an automated system is particularly expensive so that it is not suitable for use in a workshop and cannot be implemented without a complex and sophisticated optical and computerized shape recognition system, not to mention the fact that it makes the working space inaccessible for placing a steering wheel lock or a brake pedal lock, and that it is incompatible with any vehicle lifting process where the chassis adjustment intervention cannot be carried out from below the vehicle.

It therefore appeared the need for means making it possible to control the placement of the steering wheel in the neutral position without necessarily being seated in the driver's seat in the driving position and without the implementation of heavy computer resources. Another object of the invention is to provide a simple, easy to implement, and reliable system for controlling the placement of the steering wheel of a vehicle in the neutral position.

In order to achieve this objective, the invention relates to a device for assisting the placement in a neutral position of a rectilinear trajectory of the steering wheel of a vehicle, this device comprising a light source configured to project at least one light pattern defining at least one alignment direction and fixing means adapted to allow temporary fixing of the device on the vehicle so that the light source is facing or situated in a plane facing the steering wheel so that the light pattern is projected at least inside the circle delimited by the steering wheel.

Advantageously, the projection of the light alignment pattern inside the circle delimited by the steering wheel allows the operator to check the placement in the neutral position of the steering wheel without being seated in the driver's seat. Indeed, thanks to the invention the operator can check from outside the vehicle that the steering wheel is aligned with the projected light alignment pattern, without parallax error. In the event of a positioning fault, the operator can also maneuver the steering wheel from outside the vehicle to align the steering wheel with the reference pattern.

According to one characteristic of the invention, the fixing means comprise an elongated crosspiece on which the light source is fixed and which comprises at each of its two ends at least one finger forming an acute angle with the longitudinal direction of the crosspiece, the at least one of the two fingers being movable in longitudinal translation relative to the crosspiece and being associated with clamping means configured to allow gripping with the two fingers a part of the vehicle so as to fix the device on the latter. Such fixing means make it possible to easily fix the device to an element of the vehicle other than the steering wheel and which is in a fixed position with respect to the latter.

According to a variant of this characteristic, the distance between the two opposite fingers is greater than or equal to 0.9 m. According to another variant of this characteristic, the crosspiece has a length greater than or equal to 0.6 m. These variants advantageously make it possible to fix the device according to the invention to the bodywork of the vehicle and for example on or between the uprights of the two front or rear doors, the crosspiece and the light source being inside the vehicle. Such a method of fixing makes it possible to use the body or the body of the vehicle as a reference for positioning the device according to the invention. The device according to the invention can then be fixed to the body of the vehicle with the doors being open or closed—the windows being open.

According to a variant of this characteristic, the two fingers are movable in longitudinal translation with respect to the crosspiece and each one is associated with clamping means providing elastic return of the corresponding finger towards the crosspiece or the center of the crosspiece.

According to yet another variant of this characteristic, the light source is movable along the crosspiece so as to adjust the longitudinal position of the light source relative to the crosspiece. Advantageously, this variant makes it possible to place the light source substantially opposite the steering wheel.

According to another characteristic of the invention, the light pattern comprises at least one line segment.

According to yet another characteristic of the invention, the light source comprises at least one laser light source suitable for projecting at least a substantially horizontal rectilinear light line.

According to a variant of this characteristic, the light source is a laser diode suitable for projecting a cross formed from two orthogonal straight lines.

Of course, the different characteristics, variants and embodiments of the invention can be associated with each other in various combinations insofar as they are not incompatible or exclusive of each other.

BRIEF DESCRIPTION OF THE DRAWINGS

In addition, various other characteristics of the invention emerge from the appended description made with reference to the drawings which illustrate non-limiting forms of embodiment of the invention and where.

DESCRIPTION OF THE PREFERRED EMBODIMENTS

Figure 1:
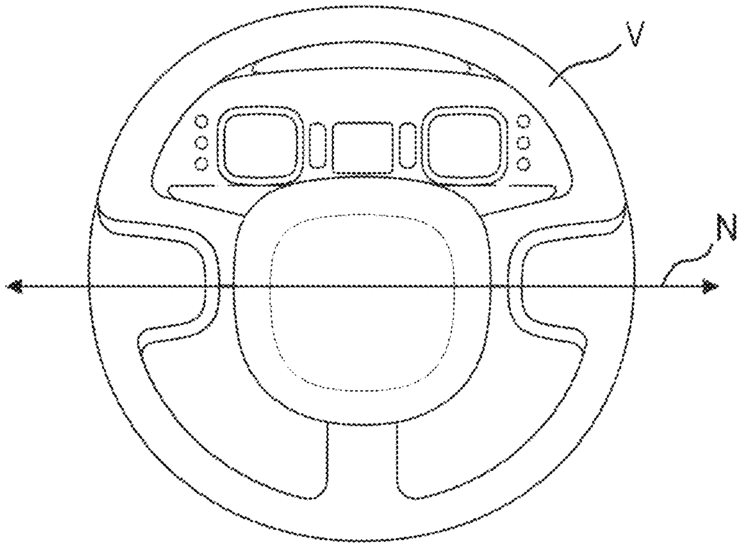
FIG. 1 is a schematic view of the neutral position of a vehicle steering wheel as observed in the driving position.

The geometry adjustment or pre-geometry operation consists in adjusting/checking the components of the running gear of a vehicle following a fault observed in trajectory and/or dynamic behavior.

This operation is either mandated by expertise, in the context of an accident and repaired vehicle, or by customer complaint, or by simple mechanical "logic" during the repair of a vehicle (for example following a mechanical operation which requires the removal/refitting/replacement of the engine subframe or the removal/refitting/replacement of an axle) or even linked to the replacement of certain worn parts such as the steering ball joints, axial ball joints, silent support blocks (defects typically noted by a technical inspection).

A badly adjusted or misaligned running gear means random vehicle trajectory, degraded handling, deviant braking, premature wear of the vehicle's rubber or tires, excessive shifting sometimes leading to a return visit to the technical inspection. A few isolated cases have also shown that the deactivation of the ESP system may be due to a heading drift. Dysfunction of the running gear or its incorrect adjustment can also induce a fault in other safety systems (active or passive) fitted to the vehicle (adaptive cruise control, white line crossing warning/lane keeping assistance, automatic emergency braking, . . . ).

This running gear adjustment is carried out in the workshop and requires specific equipment with a human worker trained in the operation but also in the equipment used.

The vehicle is placed on a lift, typically a scissor lift where the vehicle rests on its wheels. This lift is fitted with free plates for the bearing points of the wheels so as not to apply any stress on the running gear, either axial or lateral. Depending on the technology of the material used, the vehicle can also be placed on an arm lift.

There are a few preliminary steps specific to the vehicle which will not be described here, such as checking the pressure and condition of the tires, checking the loads transported unevenly distributed in the vehicle (especially in the case of lifting by a platform lift).

The operator then installs the specific geo equipment on the vehicle and/or on the lift in order to begin the work.

The detailed points of the operation will not be described because each geometry or control device for the running gear has its own implementation methods, but among all of these methods, one is common to all scenarios, that is the placement of the steering wheel V in a neutral position N.

In fact, after reading the pivot angle, caster, deviations and other characteristics, before making the necessary adjustments resulting from these preliminary measurements, the operator must hold the steering wheel of the vehicle in a very precise position, and it is in this step that device according to the invention intervenes.

Indeed, regardless of the adjustment methods or equipment used, it is always imperative to adjust a straight steering wheel position (visually, the angle of rotation given to the steering wheel must be that of a steering wheel which keeps the trajectory perfectly straight of the vehicle on a straight road, i.e. a 0 degree angle or neutral position of the steering wheel). Then, this position must be blocked with the tool provided by the equipment manufacturer of the geometry device.

As with any intervention in the workshop, even using machines, tools, instruments, there is human intervention to set up these tools or to interpret the results given by these tools. Here, in the chain of running gear adjustment operations, all the steps which the operator must carry out will not be listed.

However, in all cases, the operator must pay particular attention to a crucial point which determines the entire sequence of operations, that means the "correct" sequence of operations, because at the end of the work, during the dynamic test of the vehicle, if an anomaly is observed (and this is not so rare), he could always ask the question: was the steering wheel really straight or in the neutral position, as illustrated in FIG. 1, at the start or during adjustment. Even before putting into question the other stages of the operation, the device according to the invention aims at definitively removing the risk of incorrect positioning of the steering wheel, especially since, before removing the steering wheel lock, at the end of the operations, the device according to the invention makes it possible to check the accuracy of the position given initially and to ensure that the steering wheel has not turned during the adjustment.

With regard to positioning the steering wheel V straight (i.e. in neutral position N) and the use of the steering wheel lock B, there is no machine or mechanical device that could guide the operator in this task. The operation therefore results from an approximation which depends on the operator. In addition, the operation of locking the steering wheel in the neutral position cannot be carried out in the driving position, on the driver's seat, because the steering wheel lock B and possibly a brake pedal press, once placed, will prevent the operator from getting out of the vehicle or, if he is in the driving position, he will not be able to get out at the risk of varying the position of the steering wheel that he has just adjusted.

Figure 2:
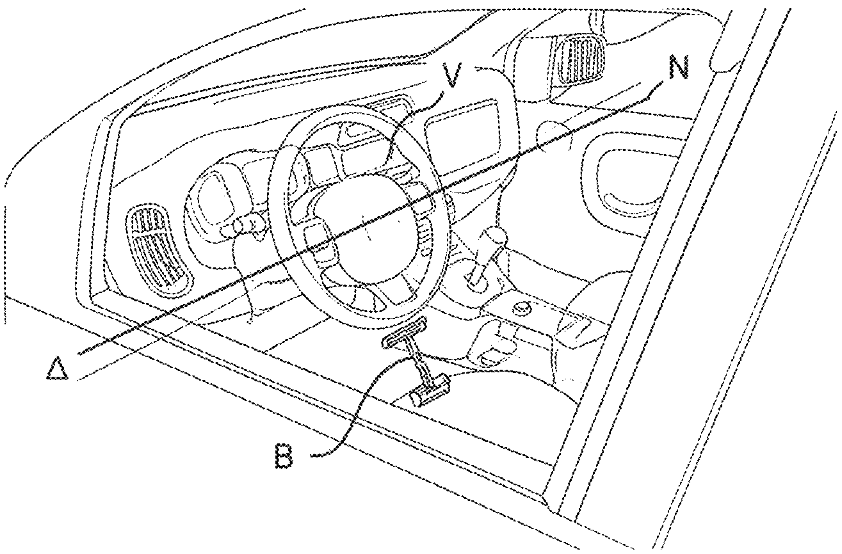
FIG. 2 is a schematic view explaining the parallax for an operator observing the steering wheel from outside the vehicle and having to place it in neutral position.

Therefore, as is commonly practiced in a workshop, this operation of adjusting and fitting the steering wheel lock is done from outside the vehicle, either with the door open, or with the door closed with the driver's window down. In any case, it is impossible for the operator to be facing the steering wheel and there is, when adjusting by eye, a parallax error as shown in FIG. 2.

In this step of positioning the steering wheel V in neutral position N, the operator intervenes from the outside or at best from the door sill of the vehicle (door open) with, a fortiori, this error of remanent interpretation Δ due to this parallax. Even if he tries to free himself from it by contorting himself, objectively he will never find the position of the driver sitting on his seat, occupying the natural driving position, facing the driving position. He will therefore make a steering wheel positioning error.

Figure 3:
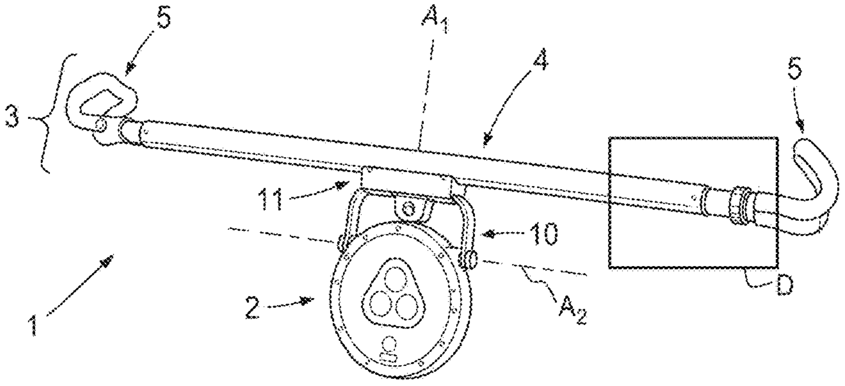
FIG. 3 is a schematic view of a device according to the invention.
Figure 4:
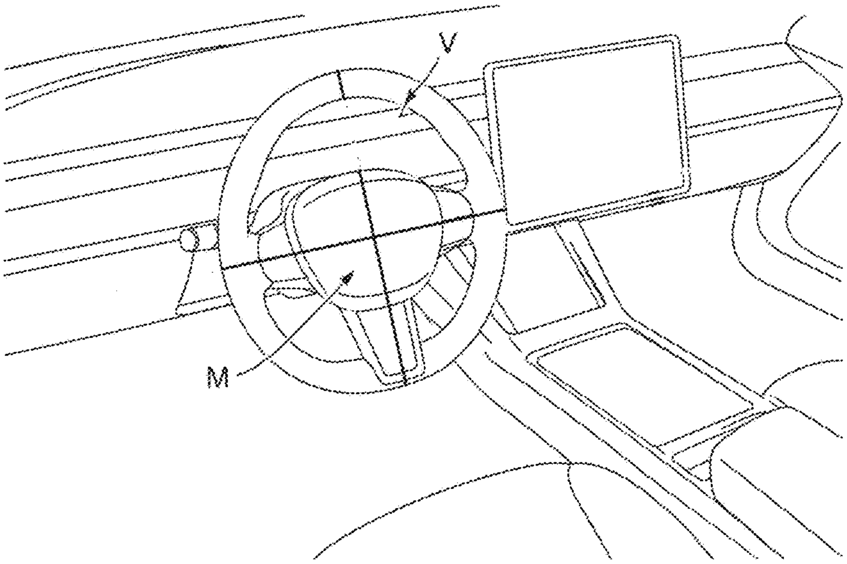
FIG. 4 illustrates a cross-shaped alignment pattern projected into the circle delimited by a vehicle steering wheel.

The invention therefore aims at avoiding this error by means of the device, according to the invention, for aiding placement in the neutral position of the straight trajectory of the steering wheel of a vehicle as illustrated in FIG. 3 and designated as a whole by the reference 1. Thus, the device 1 comprises, on the one hand, a light source 2 configured to project at least one light pattern defining at least one alignment direction and, on the other hand, fixing means 3 adapted to allow temporary fixing of the device 1 on the vehicle so that the light pattern M is projected inside the circle delimited by the steering wheel V as shown in FIG. 4.

Figure 5:
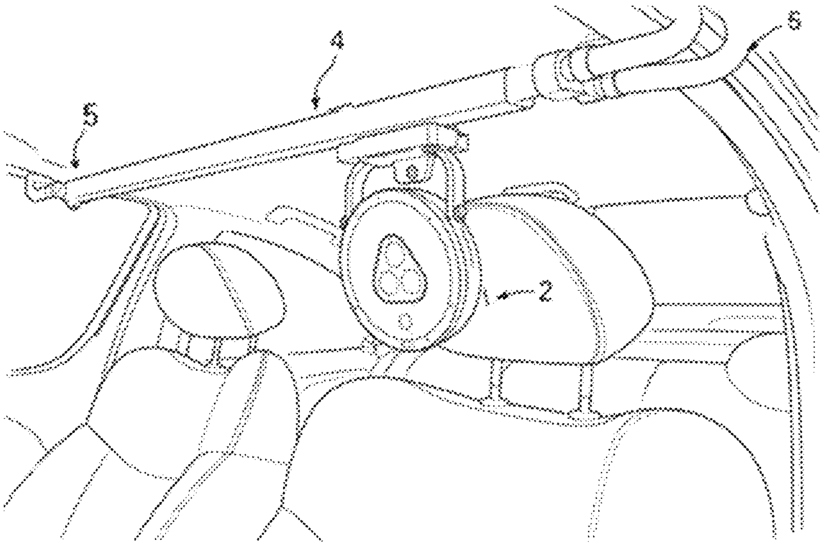
FIG. 5 shows the installation of the device according to the invention in a motor vehicle.
Figure 6:
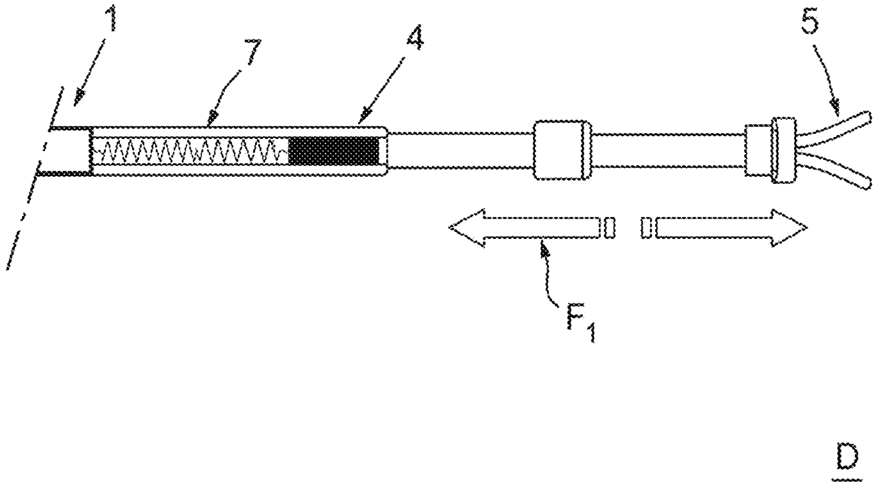
FIG. 6 shows constructive details of the fixing means of the device according to the invention and corresponds to a schematic detail view of zone D of [FIG. 3].

In the present case, the fixing means 3 of the device are formed by a self-tightening telescopic bar adapted to cling to the structure of the vehicle as more particularly illustrated in detail in FIG. 5. Such a self-tightening bar comprises an elongated crosspiece 4 on which the light source 2 is fixed. The crosspiece 4 then comprises, at each one of its two ends, at least one finger 5 generally forming an acute angle with the longitudinal direction of the crosspiece 4. At least one of the two fingers 5 and preferably the two fingers 5 are each movable in longitudinal translation relative to the crosspiece and associated with clamping means configured to allow clamping, with the two fingers, part of the vehicle so as to fix the device on the latter. These clamping means can, for example, be formed by a knurled screw making it possible to block the translation of the corresponding finger 5 with respect to the crosspiece 4. According to the illustrated example, the two fingers 5 are movable in longitudinal translation with respect to the crosspiece 4. As shown in FIG. 6, each finger 5 is associated with clamping means, such as a spring 7 located inside the hollow crosspiece 4, ensuring an elastic return of the corresponding finger, in the direction of the arrow $F_1$, towards the crosspiece or the center of the crosspiece. This embodiment makes it possible to simplify the operation of hooking or fixing the device according to the invention to the vehicle.

In addition, according to the illustrated example, the light source 2 is fitted to the crosspiece by means of a cradle 10 which itself is fixed to the crosspiece 4 via a slider 11 which is movable in translation along the crosspiece 4. The cradle 10 is connected to the slider by a pivot connection with axis $A_1$ substantially perpendicular to the direction of extension of the crosspiece 4. Finally, the light source 2 is connected to the cradle 10 by a pivot connection with axis $A_2$ perpendicular to axis $A_1$. This mode of adaptation of the light source on the crosspiece 4, by means of a system whose kinematics is similar to a universal joint, allows adjustment of the position and orientation of the light source 2 relative to the projection area of the pattern M.

It should be noted that, according to the invention, the crosspiece may comprise several segments sliding one inside the other while being associated with means for locking their relative translation. This embodiment makes it possible to adjust the length of the crosspiece 4 independently of the position of the clamping fingers with respect to said crosspiece, and, therefore, to adapt the length of the crosspiece to the dimensions of the bodywork element(s) to which the device according to the invention is hooked or fixed.

According to the illustrated example, the luminous pattern is a luminous cross projected on the target surface to initially visualize a horizontal virtual line in the passenger compartment. In order to increase the efficiency of the system, this cross is produced by a laser which points the target whatever its material or color (including black) and whatever its shape, flat or complex. It constitutes a real level of light in the passenger compartment and crosses it from side to side and via the steering wheel, the desired level for the latter. Due to the projection made on the surfaces of the steering wheel, even when viewed from the outside, there can no longer be a problem of visual interpretation and there is no longer any parallax error.

It should be noted that according to one embodiment of the invention, the light source is fixed or linked to the crosspiece so as to be movable in translation relative to the crosspiece while being able to be immobilized thereon. This embodiment then makes it possible to adjust the longitudinal position of the light source and, for example, makes it possible to place it exactly in front of the steering wheel.

Also, to perfect the use, in addition to the properties of the laser beam, the device further comprises an auxiliary light source capable of illuminating the area around the target in order to allow the user to effectively visualize the near environment in which he must operate.

According to the illustrated example, the device in accordance with the invention is suitable for:

maintaining the light source which produces the alignment pattern in the vehicle, with an optimal placement generating a light flux for passenger compartment lighting in addition to the alignment pattern ensure the possibility of adjusting the horizontality of the alignment pattern (orientation in rotation)

allow height adjustment of the alignment pattern in the passenger compartment (tilt of the light source which produces the alignment pattern allow a movement in the passenger compartment towards the steering wheel (translational movement) of the source of the alignment pattern.

The best possible placement is that of the support from the roof of the car passing through the openings of the vehicle because they are perfectly symmetrical and guarantee a positioning base perfectly parallel to the dashboard. The rearward position of the system makes it possible, thanks to the opening angle of the laser lens, to project a light trace whose width then becomes maximum and covers the entire width of the dashboard. The crosspiece of the device, which can then be called a "ruler or roof bar" formed by the self-tightening telescopic bar described above, is clamped or hooked onto the structure of the vehicle as shown in FIG. 6.

Of course, various other embodiments of the invention can be contemplated within the scope of the appended claims.

The invention claimed is:

1. A device for assisting placement in a neutral position of a rectilinear trajectory of a steering wheel of a vehicle, the device comprising:

a light source configured to project at least one light pattern comprising a line segment defining at least one alignment direction of the steering wheel; and fixing means adapted to allow temporary attachment of the device to the vehicle so that the light source faces or is located in a plane facing the steering wheel so that the light pattern is projected at least inside a circle delimited by the steering wheel and on the steering wheel surface, wherein the fixing means comprise an elongated crosspiece on which the light source is fixed, the crosspiece including at each end thereof at least one finger forming an acute angle with a longitudinal direction of the crosspiece, at least one of the two fingers being movable in longitudinal translation with respect to the crosspiece and being associated with clamping means configured to allow gripping with the two fingers a part of the vehicle so as to fix the device on the part of the vehicle.

2. The device according to claim 1, wherein the two fingers are movable in longitudinal translation and each one of the two fingers is associated with the clamping means providing elastic return of the corresponding finger towards the crosspiece.

3. The device according to claim 2, wherein a distance between the two opposite fingers is greater than or equal to 0.9 m.

4. The device according to claim 1, wherein the light source is movable along the crosspiece so as to adjust a longitudinal position of the light source with respect to the crosspiece.

5. The device according to claim 1, wherein the crosspiece has a length greater than or equal to 0.6 m.

6. The device according to claim 1, wherein the light source is adapted to the crosspiece by means of a cradle attached to the crosspiece via a ram that is movable in translation along the crosspiece, the cradle being connected to the ram by a pivot connection of a first axis substantially perpendicular to a direction of extension of the crosspiece and the light source being connected to the cradle by a pivot connection of a second axis perpendicular to the first axis.

7. The device according to claim 1, wherein the light source comprises at least one laser light source adapted to project at least one horizontal rectilinear line of light.

8. The device according to claim 7, wherein the light source is a laser diode suitable for projecting a cross formed from two orthogonal straight lines.

9. The device according to claim 1, wherein the light pattern comprises at least one line segment.

10. The device according to claim 1, wherein the line segment of the light pattern has a light trace whose width is adapted to cover an entire width of a dashboard of the vehicle and crosses the passenger compartment of the vehicle through and through, forming a luminous level of the passenger compartment.

11. The device according to claim 1, wherein the fixings means are configured to:

enable adjustment of a horizontal orientation of the light pattern by rotation of the light source;

allow height adjustment of the light pattern in the vehicle passenger compartment by tilting the light source producing the light pattern; and allow the light source to move in the passenger compartment towards the steering wheel by a translational movement.

12. The device according to claim 1, wherein the fixings means are adapted to cling to a structure of the vehicle.

13. The device according to claim 1, wherein the fixings means are adapted to cling to a roof of the vehicle passing through an opening of the vehicle.

14. A device for assisting the placement in the neutral position of a rectilinear trajectory of the steering wheel of a vehicle, the device comprising a light source configured to project at least one light pattern comprising a line segment defining at least one alignment direction of the steering wheel and fixing means adapted to allow temporary attachment of the device to the vehicle so that the light source faces or is located in a plane facing the steering wheel so that the light pattern is projected at least inside the circle delimited by the steering wheel, wherein the line segment of the light pattern has a light trace whose width is adapted to cover the entire width of a dashboard of the vehicle and crosses the passenger compartment of the vehicle through and through, forming a luminous level of the passenger compartment.

15. The device according to claim 14, wherein the fixings means are configured to:

enable adjustment of a horizontal orientation of the light pattern by rotation of the light source;

allow height adjustment of the light pattern in the vehicle passenger compartment by tilting the light source producing the light pattern; and allow the light source to move in the passenger compartment towards the steering wheel by a translational movement.

16. The device according to claim 14, wherein the fixing means comprise an elongated crosspiece on which the light source is fixed, the crosspiece including at each end thereof at least one finger forming an acute angle with a longitudinal direction of the crosspiece, at least one of the two fingers being movable in longitudinal translation with respect to the crosspiece and being associated with clamping means configured to allow gripping with the two fingers a part of the vehicle so as to fix the device on the part of the vehicle.

17. The device according to claim 16, wherein the two fingers are movable in longitudinal translation and each one of the two fingers is associated with the clamping means providing elastic return of the corresponding finger towards the crosspiece.

18. The device according to claim 16, wherein the light source is movable along the crosspiece so as to adjust a longitudinal position of the light source with respect to the crosspiece.

19. The device according to claim 16, wherein a distance between the two opposite fingers is greater than or equal to 0.9 m.

20. The device according to claim 16, wherein the crosspiece has a length greater than or equal to 0.6 m.

21. The device according to claim 16, wherein the light source is adapted to the crosspiece by means of a cradle attached to the crosspiece via a ram that is movable in translation along the crosspiece, the cradle being connected to the ram by a pivot connection of a first axis substantially perpendicular to a direction of extension of the crosspiece and the light source being connected to the cradle by a pivot connection of a second axis perpendicular to the first axis.

* * * * *